US009354132B2

(12) United States Patent
Kang et al.

(10) Patent No.: US 9,354,132 B2
(45) Date of Patent: May 31, 2016

(54) JOINTLESS PRESSURE SENSOR PORT (75) Inventors: Yanling Kang, Northbrook, IL (US); Daniel J. Bratek, Arlington Heights, IL (US); Robert C. Kosberg, Wildwood, IL (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 771 days.

(21) Appl. No.: 13/424,831

(22) Filed: Mar. 20, 2012

(65) Prior Publication Data

US 2013/0139603 A1 Jun. 6, 2013

Related U.S. Application Data (63) Continuation-in-part of application No. 12/369,747, filed on Feb. 12, 2009, now Pat. No. 8,365,605.

(51) Int. Cl.
| *G01L 7/08* | (2006.01) |
| *G01L 13/02* | (2006.01) |
| *G01L 15/00* | (2006.01) |
| *H01G 7/00* | (2006.01) |
| *G01L 7/02* | (2006.01) |
| *G01L 19/14* | (2006.01) |
| *G01L 9/00* | (2006.01) |

(52) U.S. Cl.
CPC . *G01L 7/02* (2013.01); *G01L 7/082* (2013.01); *G01L 9/0051* (2013.01); *G01L 19/14* (2013.01)

(58) Field of Classification Search
None
See application file for complete search history.

(56) References Cited

U.S. PATENT DOCUMENTS

| 4,753,109 | A | | 6/1988 | Zabler | 73/114.18 |
| 4,864,271 | A | | 9/1989 | Yajima | 338/4 |
| 4,972,579 | A | * | 11/1990 | Yajima | B28B 1/002 156/89.12 |
| 5,488,868 | A | | 2/1996 | Ootake et al. | 73/708 |
| 5,712,424 | A | | 1/1998 | Reed | 73/114.16 |
| 5,714,680 | A | | 2/1998 | Taylor et al. | 73/37 |
| 6,453,747 | B1 | * | 9/2002 | Weise et al. | 73/715 |
| 6,763,724 | B2 | * | 7/2004 | DiPaola et al. | 73/717 |
| 6,986,285 | B2 | * | 1/2006 | Avisse | 73/726 |
| 7,100,455 | B2 | * | 9/2006 | Lepine et al. | 73/753 |
| 7,270,010 | B2 | * | 9/2007 | Kaneko et al. | 73/753 |

(Continued)

FOREIGN PATENT DOCUMENTS

| DE | 3817695 | 12/1988 |
| DE | 3907202 | 9/1990 |

OTHER PUBLICATIONS

International Search Report and Written Opinion for PCT/US2010/024020, filed Feb. 12, 2010.

*Primary Examiner* — Peter Macchiarolo
*Assistant Examiner* — Jermaine Jenkins (57) ABSTRACT

A jointless pressure sensor port which includes a body portion, a flange portion integrally formed with the body portion, and a cylindrical portion integrally formed with and extending away from the flange portion. The port also includes an aperture having a first area, where the aperture is formed as part of the cylindrical portion. A channel is located along an axis and has at least one channel region. The channel at least partially extends through the cylindrical portion, the flange portion, and the body portion. A diaphragm includes a second area which is larger than the first area, the diaphragm also has a top surface and a bottom surface. A pressure sensor is disposed on the top surface, and the diaphragm is substantially perpendicular to the axis of the channel. The body portion, flange portion, and cylindrical portion form a jointless and seamless pressure sensor part.

14 Claims, 6 Drawing Sheets

(56) References Cited

U.S. PATENT DOCUMENTS

| | | |
|---|---|---|
| 7,475,597 B2 | 1/2009 | Brida et al. .................... 73/715 |
| 7,530,275 B2 | 5/2009 | Wiedemann et al. ........... 73/715 |
| 7,900,520 B2* | 3/2011 | Colombo ........................ 73/754 |
| 7,954,384 B2* | 6/2011 | Koehler et al. ................. 73/756 |
| 2002/0184955 A1* | 12/2002 | Parker ............................ 73/756 |
| 2005/0097721 A1 | 5/2005 | Bratek et al. ................... 29/505 |
| 2005/0139008 A1 | 6/2005 | Kaiser et al. |
| 2006/0053894 A1 | 3/2006 | Kunda et al. |
| 2007/0220989 A1 | 9/2007 | Uchigashima et al. |

\* cited by examiner

JOINTLESS PRESSURE SENSOR PORT

CROSS-REFERENCE TO RELATED APPLICATIONS

This application is a continuation in-part of U.S. patent application Ser. No. 12/369,747, filed Feb. 12, 2009. The disclosure of the above application is incorporated herein by reference.

FIELD OF THE INVENTION

The invention relates generally to the field of pressure sensor ports.

BACKGROUND OF THE INVENTION

Pressure sensors are generally known, and are used for pressure sensing in harsh media, in high-pressure applications such as engine oil, engine transmission, braking systems, refrigerant systems, and fuel injection systems.

In industry today, high pressure sensors are typically made up of a metal or other high strength material to make a high pressure vessel or port that has a specially designed diaphragm integrated into or attached to the port. There is also an opening to allow fluid pressure to enter and a channel for the fluid to pass thru to enter into the diaphragm pressure vessel. The diaphragm is the part of the mechanical structure which is used to turn fluid pressure into a mechanical stress by means of the physical geometry and materials used. Typically, a diaphragm is an area of a pressure vessel which is structurally weakened in order to allow for slight deflection or a concentration of stresses. Mechanical stress is then measured by a sensing element, such as a piezo resistive strain gauge, which is physically bonded to the diaphragm to vary an electrical signal proportional to the mechanical stress in the diaphragm, which can then be conditioned and tuned via an ASIC (Application Specific Integrated Circuit) to generate an electronic pressure sensor output. The sense element is typically located on the outside of the pressure vessel diaphragm, especially in conditions where the media which is creating the pressure may cause damage to electronics, such as those which make up the pressure sensing element or signal conditioning ASIC.

Current high pressure sensor designs are limited in a number of ways. One limitation is that a port and diaphragm combined together and made of a single piece requires the pressure access hole or aperture be equal to or larger than the sensing diaphragm for designs when the diaphragm is oriented perpendicular to the axis of the bore. The access hole being larger than the diaphragm when the diaphragm is perpendicular to the axis of the bore negatively impacts pressure sensitivity, mounting interface size, and parametric performance. This limits the design such that the port opening size is always dictated by the diaphragm size or vice versa for pressure ports with diaphragms which are oriented perpendicular to the axis of the bore.

Another limitation is that a combined port and diaphragm made of multiple pieces requires welding, brazing, or some other joining process. A multiple piece port does address pressure sensitivity, and mounting interface size, but negatively impacts cost, sensor reliability due to extra components and joining processes. These joining processes are complicated, costly, or may not be robust enough to meet strength and fatigue requirements for high pressure applications. Joints may be weak areas, which may fail when exposed to pressure.

Accordingly, there exists a need for a jointless pressure sensor which is less costly to manufacture, satisfies various strength and durability requirements, and is flexible enough in design for use in different applications.

SUMMARY OF THE INVENTION

The present invention is a jointless pressure sensor port which overcomes the aforementioned drawbacks. The jointless pressure sensor port of the present invention decouples the design constraints of the port and the diaphragm providing complete design freedom and flexibility in a single piece design. In one embodiment, a small port opening is connected to a larger diaphragm which allows for an increase in sensitivity and overall performance. In addition, the geometry of the channel or path way which connects the access hole to the diaphragm area may be virtually any shape, size, or contour (this is useful when trying to control flow of different types of fluids). This is done in a jointless, one piece design which does not suffer from the problems of multiple piece designs.

In one embodiment, the present invention is a method for measuring pressure through a jointless pressure sensor port, the method including the steps of permitting a substance to pass into a jointless pressure sensor port including an aperture, a channel, and a diaphragm having a larger are than the area of the aperture, allowing the substance to come into contact with the diaphragm resulting in a mechanical stress on the diaphragm, and measuring the mechanical stress to generate an electrical signal indicative of the substance pressure.

In another embodiment, the jointless pressure sensor port of the present invention includes a pressure sensor port having a housing, where the housing is jointless; the housing including an aperture, a channel, and a diaphragm; where the diaphragm area is larger than the aperture area; where the aperture is configured to direct a substance through the channel toward the diaphragm; and where the substance is configured to exert a mechanical stress on the diaphragm.

In yet another embodiment, the jointless pressure sensor port of the present invention includes a pressure sensor port having a housing, where the housing is jointless; the housing including an aperture, a channel, and a diaphragm; where the diaphragm area is larger than the aperture area; where the aperture is configured to direct a substance through the channel toward the diaphragm; and where the substance is configured to exert a mechanical stress on the diaphragm.

Numerous additional embodiments are also possible.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In some embodiments, the jointless pressure sensor port may be used in any system where pressure needs to be measured and monitored. Systems include harsh media and high pressure applications such as the oil and transmission fluids of an engine. In an automobile, pressures in the braking, refrigerant, and fuel injection systems may also be measured. In all these systems, a substance, such as a fluid, enters into the pressure sensor through an aperture and then passes through a channel towards the diaphragm region of the sensor. The substance exerts a mechanical stress on the diaphragm. The stress is then measured and a signal representative of the pressure inside the sensor is generated. The jointless pressure sensor port has increased pressure sensitivity due to the fact that the diaphragm area is larger than the area of the aperture. The size of the mounting interface between the pressure sensor port and the system being monitored is also reduced due to the smaller aperture area of the pressure sensor port. Such a port is also more reliable as a result of its construction and lack of any joints, brazes, or welds.

In some embodiments, the diaphragm area may have a circular geometry. The aperture may also be circular. Like the diaphragm and aperture, the cross section of the channel may also be a circle. The aperture, diaphragm, and channel cross sections may have any geometrical shape as long as the area of the diaphragm is larger than the area of the aperture.

In some embodiments, the channel region of the jointless pressure sensor port may have one or more taper sections. The channel region closest to the aperture may have a taper to match the aperture area to the area of the channel region. The taper directs the substance into the pressure sensor and towards the diaphragm. The channel region closest to the diaphragm may also have a taper section that matches the channel area to the diaphragm area.

In some embodiments, the jointless pressure sensor port may have two or more diaphragms. The diaphragms may have different areas and dimensions. These diaphragms integrated to a single jointless pressure sensor port allow for increased sensitivity across a broader range of pressures. The multiple diaphragms also allow for sensor redundancy as the stresses on the multiple diaphragms may be independently measured using multiple sensors.

Figure 1:
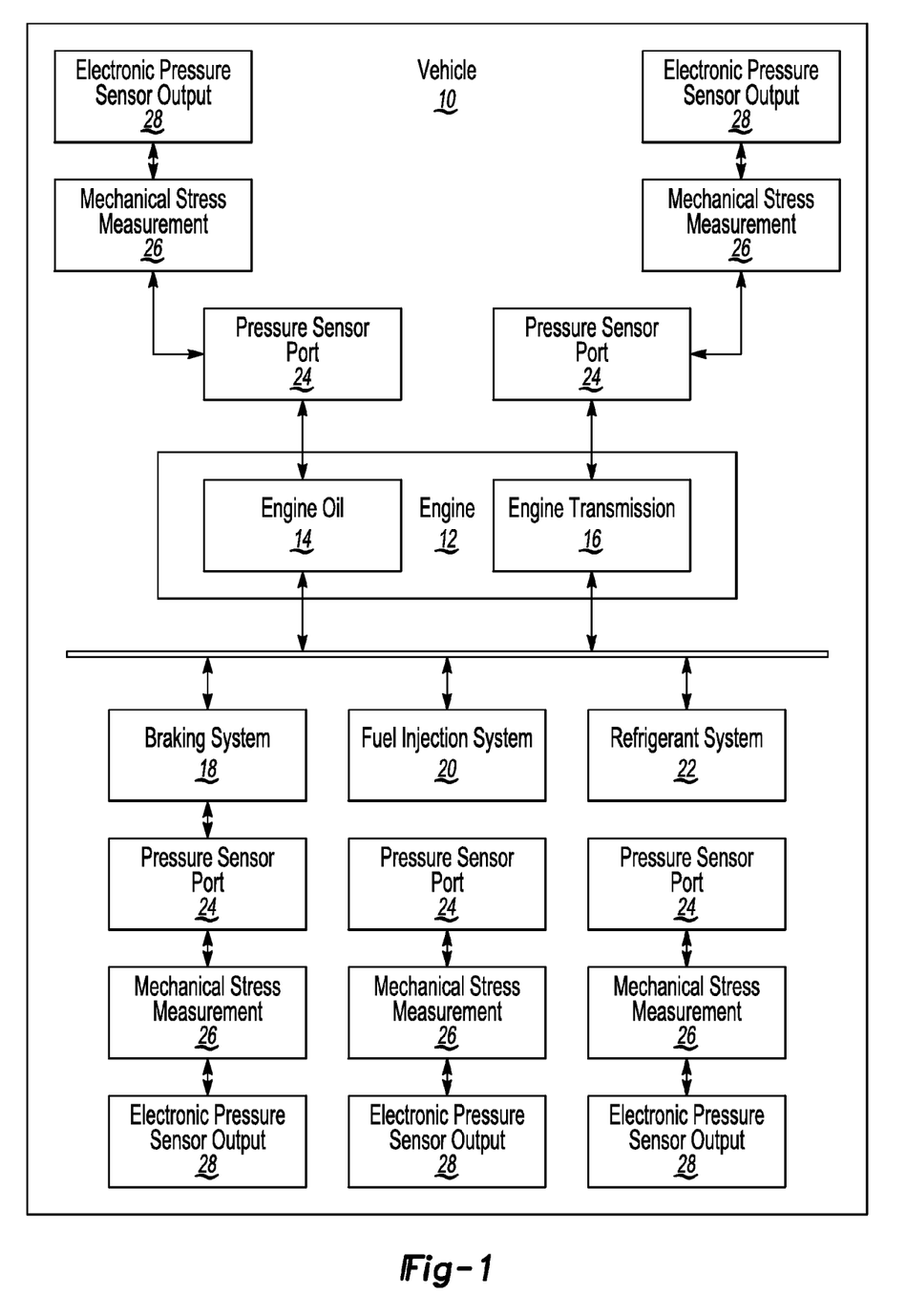
FIG. 1 is a block diagram illustrating a method for measuring pressure through a jointless pressure sensor port for different systems of a vehicle, in accordance with some embodiments.

FIG. 1 is a block diagram illustrating a method for measuring pressure through a jointless pressure sensor port for different systems of a vehicle, in accordance with some embodiments.

In some embodiments, vehicle 10 comprises an engine 12 having engine oil 14 and transmission fluid 16. The vehicle 10 also comprises a braking system 18, a fuel injection system 20, and a refrigerant system 22. Each of these components contains a fluid or some other substance whose pressure needs to be monitored. In the engine 12, engine oil 14 is directed into the pressure sensor port 24. The fluid exerts a mechanical stress on the diaphragm of the pressure sensor port 24. This mechanical strain is measured 26 and an electronic pressure sensor output 28 is generated. A similar process occurs for measuring the fluid pressures in the engine transmission 16, the braking system 18, the fuel injection system 20, and the refrigerant system 22.

Figures 2, 3:
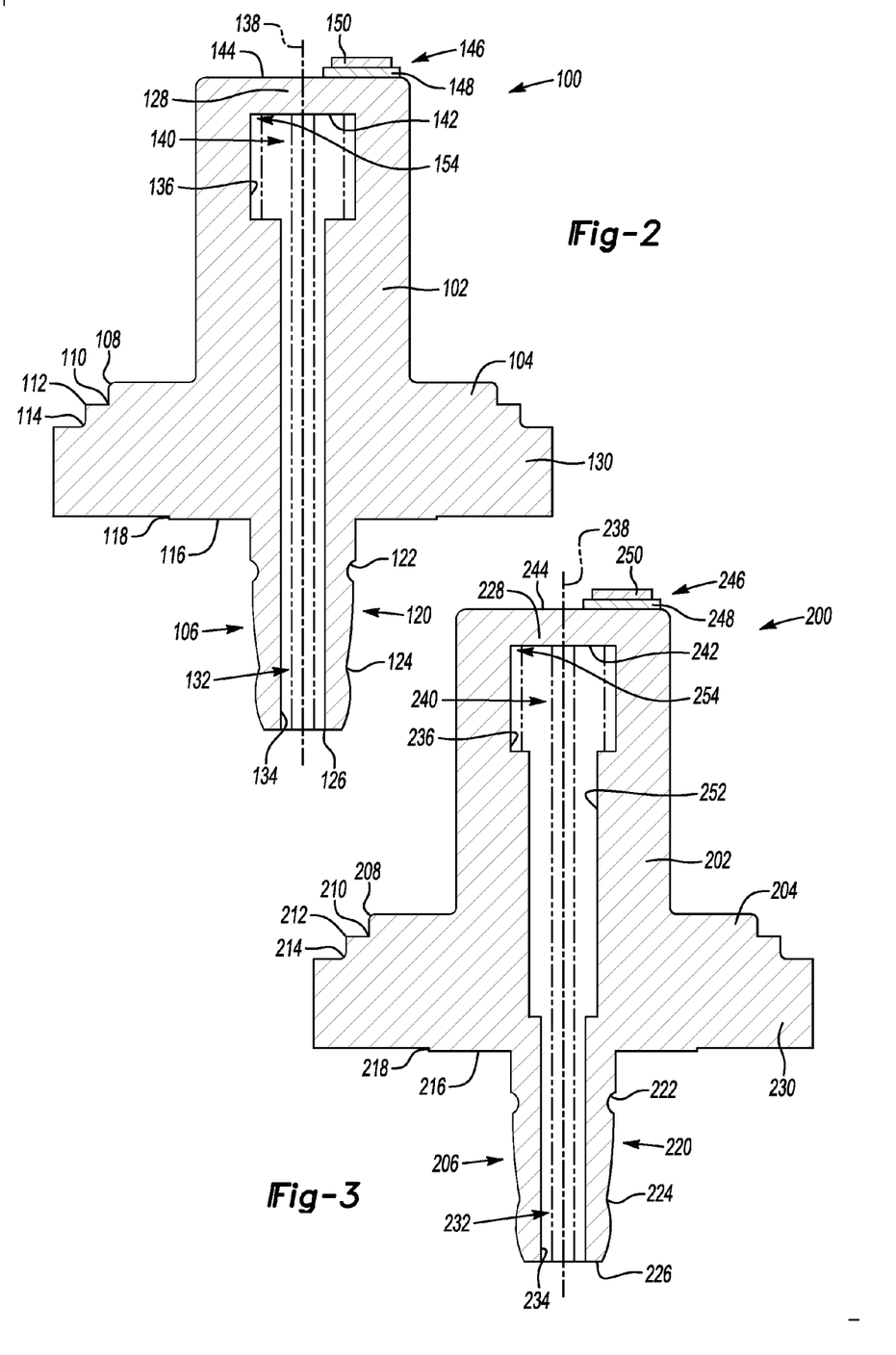
FIG. 2 is a cross sectional view of a jointless pressure sensor port having a larger diaphragm area than aperture area, in accordance with some embodiments.
FIG. 3 is a cross sectional view of a jointless pressure sensor port having a larger diaphragm area than aperture area and a channel region of three areas, in accordance with some embodiments.

FIG. 2 is a cross sectional view of a jointless pressure sensor port having a diaphragm with an area which is larger than the area of an aperture, in accordance with some embodiments.

A first embodiment of a jointless pressure sensor port is shown in FIG. 2 generally at 100. The port 100 is made of a body portion 102, a flange portion 104, and a cylindrical portion, shown generally at 106. Formed as part of the flange portion 104 are several notches and curved portions. More specifically, there is a first curved portion 108 integrally formed as part of the cylindrical portion 106, as well as a first notch 110, a second notch 112, and a second curved portion 114.

There is also an alignment feature 116 integrally formed with the flange portion 104, as well as a lower notch 118 which is part of the alignment feature 116. The alignment feature 116 extends downwardly when looking at FIG. 2, and is received into a recess (not shown) which may be part of a device the sensor port 100 is attached to, for providing proper alignment with the device.

The cylindrical portion 106 extends away from the flange portion 104, and more particularly, extends away from the alignment feature 116. Integrally formed as part of the cylindrical portion 106 is a plurality of attachment features, which provide clinching geometry, shown generally at 120. The clinching geometry 120 includes a rounded detent 122 and an angled detent 124. When the sensor port 100 is attached to the device, material from the device (the sensor port 100 is attached to) is deformed into and around the detents 122, 124, securing the connection between the sensor port 100 and the device.

While the attachment features are shown in the form of clinching geometry 120, it is within the scope of the invention that other types of attachment features may be used, such as threads, or other sealing methods.

The sensor port 100 also includes an aperture 126 and a diaphragm 128. The area of the aperture 126 is smaller than the area of the diaphragm 128. The body portion 102, flange portion 104, and cylindrical portion 106 are all formed as one component. More specifically, the pressure sensor port 100 is made from a single piece of material 130 and does not have any welds, brazes, or junctions. The aperture 126 and diaphragm 128 are connected via a channel, shown generally at 132, having two regions. A first channel region 134 has the same area as the aperture 126, and the second channel region 136 has the same area as the diaphragm 128. The larger area of the diaphragm 128 compared to the smaller area of the aperture 126 allows for an increase in sensitivity and overall performance. The channel 132 has an axis 138, which extends along the center of both regions 134,136, and extends through the center of the diaphragm 128. The diaphragm 128 is perpendicular relative to the axis 138 of the channel 132.

The second channel region 136 includes a cavity, shown generally at 140, and the diaphragm 128 has a bottom surface 142, and a top surface 144. Mounted to the top surface 144 is a pressure sensor, shown generally at 146. The pressure sensor 146 includes a glass substrate 148 mounted to the top surface 144, and a pressure sensor resistive bridge or strain gauge 150. The pressure sensor resistive bridge 150 is mounted to the glass substrate 148, and the glass substrate 146 transmits stresses to the pressure sensor resistive bridge 150 from the diaphragm 128 based on the amount of fluid pressure applied to the diaphragm 128. In some embodiments, the pressure sensor resistive bridge 150 may be a Wheatstone bridge, but it is within the scope of the invention that another type of pressure sensor resistive bridge may be used.

FIG. 3 is a cross sectional view of a jointless pressure sensor port having a diaphragm with an area which is larger than the area of an aperture, and a channel region of three different areas, in accordance with some embodiments.

In the embodiment shown in FIG. 3, the jointless pressure sensor port 200 is similar to the jointless pressure sensor port 100 shown in FIG. 2, with like numbers referring to like elements differing by one-hundred. In a similar manner compared to the port 100 shown in FIG. 2, the jointless pressure sensor port 200 includes an aperture 226 having an area smaller than the area of the diaphragm 228. The pressure sensor port 200 is made from a single piece of material 230 and does not have any welds, brazes, or junctions. More specifically, the body portion 202, the flange portion 204, and cylindrical portion 206 are all formed as one component. The aperture 226 and diaphragm 228 are connected via a channel, shown generally at 232, but in this embodiment the channel 232 includes three regions. One channel region 234 has the same area as the aperture 226 area. Another channel region 236 has the same area as the diaphragm 228 area. There is also an intermediate channel region 252 having an area that is larger than the area of the aperture 226 and smaller than the area of the diaphragm 228. The diaphragm 228 being larger in area compared to the area of the aperture 226 allows for an increase in sensitivity and overall performance. The diaphragm 228 is perpendicular to the axis 238 of the channel 232.

Figures 4, 5:
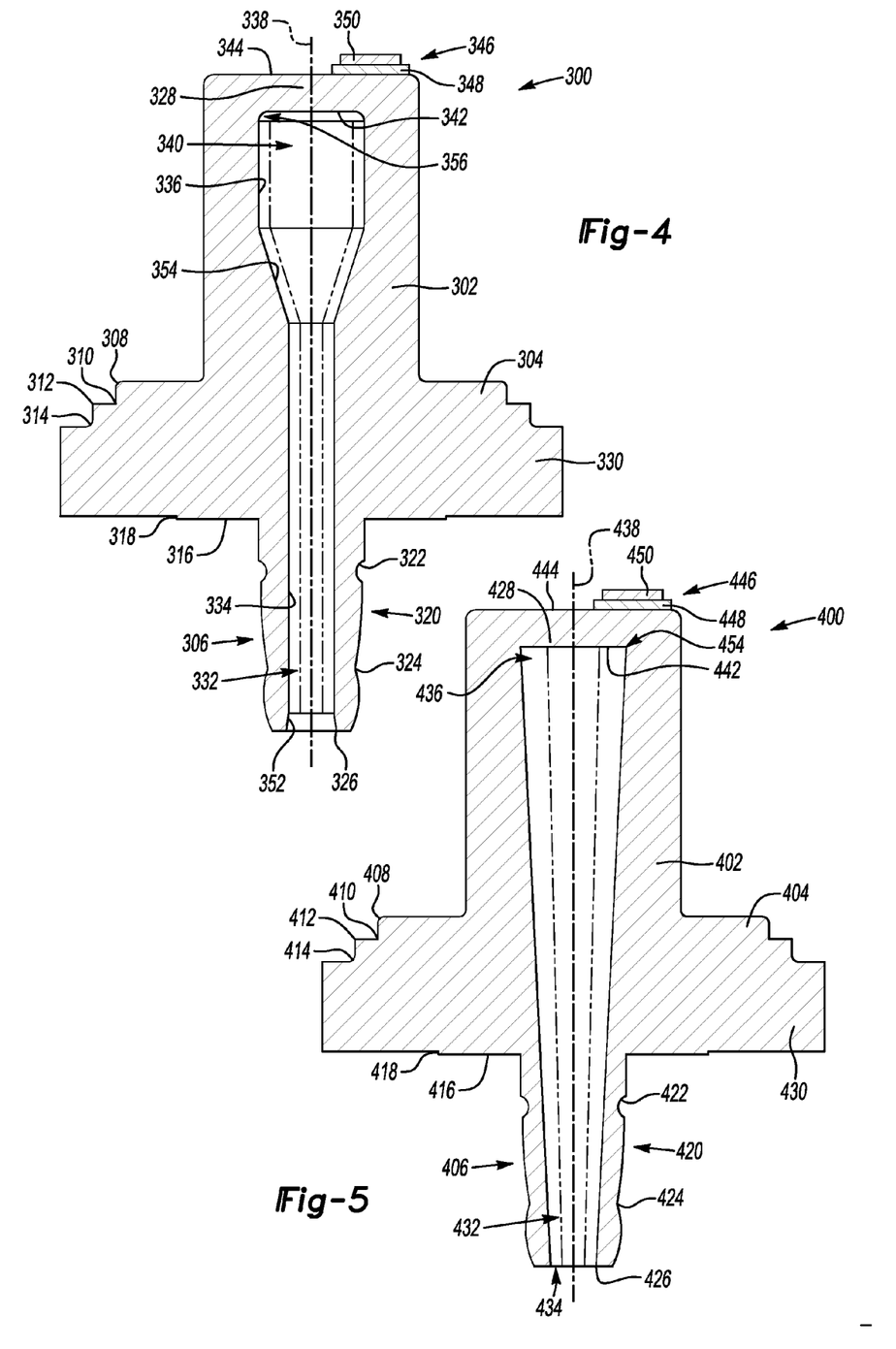
FIG. 4 is a cross sectional view of a jointless pressure sensor port having a larger diaphragm area than aperture area and some regions of the channel having tapers, in accordance with some embodiments.
FIG. 5 is a cross sectional view of a jointless pressure sensor port having a larger diaphragm area than aperture area and a tapered channel, in accordance with some embodiments.

FIG. 4 is a cross sectional view of a jointless pressure sensor port having a diaphragm with an area which is larger than the area of an aperture, and some regions of the channel having tapers, in accordance with some embodiments.

In the embodiment shown in FIG. 4, the jointless pressure sensor port 300 is similar to the joinless pressure sensor port 100 shown in FIG. 2, with like numbers referring to like elements differing by two-hundred. The jointless pressure sensor port 300 has a channel, shown generally at 332, having several channel regions, each channel region having a different area. In addition to having channel regions 334,336, which are similar to the respective channel regions 134,136, 234,236 shown in the previous embodiments, the channel 332 also includes a first tapered channel region 352, where the area of the first tapered channel region 352 varies in a taper in order to direct the fluid or substance through the aperture 326 and into the pressure sensor port 300. The channel 332 also has a second tapered channel region 354, where the area of the second tapered channel region 354 varies in a taper to match the area of the channel region 334 and the area of the diaphragm 328. The pressure sensor port 300 is made from a single piece of material 330 and does not have any welds, brazes, or junctions. More specifically, the body portion 302, flange portion 304, and cylindrical portion 306 are all formed as one component. The larger diaphragm 328 compared to the smaller opening of the aperture 326 allows for an increase in sensitivity and overall performance. The diaphragm 328 is perpendicular to the axis 338 of the channel 334.

FIG. 5 is a cross sectional view of a jointless pressure sensor port having a diaphragm with an area which is larger than the area of an aperture, and a tapered channel, in accordance with some embodiments.

In the embodiment shown in FIG. 5, the jointless pressure sensor port 400 is similar to the joinless pressure sensor port 100 shown in FIG. 2, with like numbers referring to like elements differing by three-hundred. The jointless pressure sensor port 400 shown in FIG. 5 has a channel, but the channel is a tapered channel, shown generally at 432. The channel 432 has a first end, shown generally at 434 and a second end, shown generally at 436. The area of the first end 434 matches the area of the aperture 426, and the area of the second end 436 matches the area of the diaphragm 428. The pressure sensor port 400 is made from a single piece of material 430 and does not have any welds, brazes, or junctions. More specifically, the body portion 402, flange portion 404, and cylindrical portion 406 are all formed as one component. The larger diaphragm 428 compared to the smaller aperture 426 opening allows for an increase in sensitivity and overall performance. The diaphragm 428 is perpendicular to the axis 438.

Figure 6:
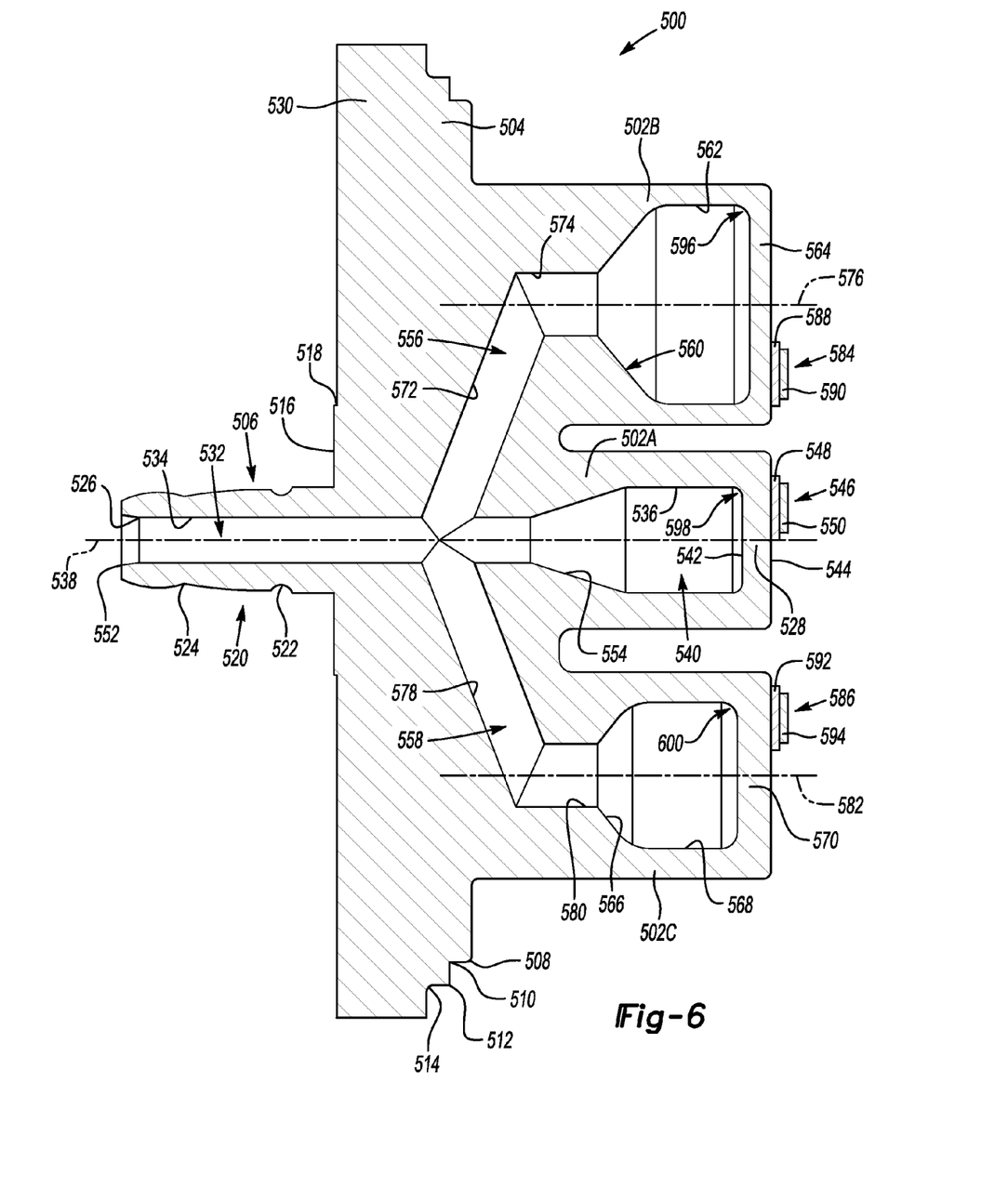
FIG. 6 is a cross sectional view of a jointless pressure sensor port having multiple diaphragms.

FIG. 6 is a cross sectional view of a jointless pressure sensor port having multiple channels and multiple diaphragms.

In the embodiment shown in FIG. 6, the jointless pressure sensor port 500 is similar to the joinless pressure sensor port 100 shown in FIG. 2, with like numbers referring to like elements differing by four-hundred. The jointless pressure sensor port 500 shown in FIG. 5 includes a channel, shown generally at 532, which includes a first channel region 534 and a second channel region 536, and also includes a first tapered channel region 552 and second tapered channel region 554, which are similar to the tapered channel regions 352,354 shown in FIG. 4.

In some embodiments, the jointless pressure sensor port 500 may have multiple channels and multiple diaphragm regions of varying dimensions and area. More specifically, the jointless pressure sensor port 500 shown in FIG. 6 includes a second channel, shown generally at 556, and a third channel, shown generally at 558, and three body portions. More specifically, the pressure sensor port 500 includes a first body portion 502A, a second body portion 502B, and a third body portion 502C. The second channel 556 is in fluid communication with the channel 532, and the second channel 556 also includes a third tapered channel region 560, a third channel region 562, and a second diaphragm 564. The third channel 558 includes a fourth tapered channel region 566, a fourth channel region 568, and a third diaphragm 570.

The second channel 556 and the third channel 558 are made up of various shapes to allow for fluid communication between the channel 532 and the channel regions. More specifically, the second channel 556 includes an angled portion 572 and a parallel portion 574 located along an axis 576, and the third channel 558 also includes an angled portion 578 and a parallel portion 580 located along an axis 582. Each of the parallel portions 574,580 has an axis 576,582, and each axis 576,582 is parallel to the axis 538 of the channel 532.

Connected to each diaphragm 528,564,570 is a pressure sensor. There is a second pressure sensor, shown generally at 584, connected to the second diaphragm 564, and a third pressure sensor, shown generally at 586, connected to the third diaphragm 570. The second pressure sensor 584 also includes a glass substrate 588, and a pressure sensor resistive bridge 590. The third pressure sensor 586 also includes a glass substrate 592, and a pressure sensor resistive bridge 594.

A single aperture 526 is configured to direct a substance through the channel 532 toward the diaphragms 528,564,570. The pressure sensor port 500 is made from a single piece of material 530 and does not have any welds, brazes, or junctions. More specifically, the body portions 502A,502B,502C, the flange portion 504, and cylindrical portion 506 are all formed as one component. The multiple diaphragms 528,564, 570 allow for pressure measurements across a larger pressure range as well as for sensor redundancy. In some embodiments, each diaphragm 528,564,570 is of a different size, as shown in FIG. 6, but it is also within the scope of the invention that in other embodiments two of the diaphragms 528,564, 570 may be of the same size, and one of the diaphragms 528,564,570 may be of the different size. It yet other embodiments, all three diaphragms 528,564,570 may be of the same size. Each diaphragm 528,564,570 is substantially perpendicular to the axis 538 of the channel 532, but it is within the scope of the inventions that the diaphragms 528,564,570 may be oriented such that only one of the diaphragms 528,564,570 is perpendicular to the axis 538, only two of the diaphragms 528,564,570 are perpendicular to the axis 538, or none of the diaphragms 528,564,570 are perpendicular to the axis 538.

The use of multiple diaphragms 528,564,570 provides different functions. One of these functions is redundancy; multiple diaphragms 528,564,570 having multiple pressure sensors 546,584,586 allow for multiple pressure readings which provides for an increased level of accuracy when acquiring pressure readings.

Another potential function of using multiple pressure sensors 546,584,586 is a high level of accuracy. If the pressure range for an application is between 0 bar and 300 bar, the diaphragm 528 having the first pressure sensor 546 may be calibrated to most accurately measure pressure in the range of 0 bar to 150 bar, the diaphragm 564 having the second pressure sensor 584 may be calibrated to most accurately measure pressure in the range of 100 bar to 250 bar, and the diaphragm 570 having the third pressure sensor may be calibrated to most accurately measure pressure in the range of 200 bar to 300 bar. Having the overlap in measured pressure ranges and each of the pressure sensors 546,584,586 calibrated to measure a different pressure range allows for an increased level of accuracy, and also allows for measurement of pressure level across a broader range.

It can also be seen in FIGS. 2-6 that each of the channels has various radius dimensions. A smaller or sharp radius, allows for an increase in pressure sensitivity, but reduces fatigue life. A larger radius helps in increase fatigue life, but is less sensitive and more suitable for use with high pressure applications.

More specifically, the channel regions 140,240,252,432 shown in FIGS. 2, 3, and 5 have sharp radiuses, such as the sharp radius, shown generally at 154 in FIG. 2, the sharp radius shown generally at 254 in FIG. 3, and the sharp radius shown generally at 454 in FIG. 5. The radiuses 154,254,454 are generally in the range of 0.25 mm to 0.50 mm, and are used for applications which relatively low pressures are measured, such as, but not limited to, 0 bar to 300 bar.

Conversely, the channel regions 336,536,562,568 have a larger radius. More specifically, the channel region 336 has a wide, or larger radius, shown generally at 356 in FIG. 4, and the channel regions 536,562,568 have larger radiuses, shown at 596,598,600, respectively, in FIG. 6. The radius 356 shown in FIG. 4 and the radiuses 596,598,600 shown in FIG. 6 may be about 1.0 mm, allow for the sensors to be used in applications where the pressure is in the range of generally 0 bar to 3000 bar, but it is within the scope of the invention other sizes may be used as well to suit different pressure ranges.

The pressure ranges in the application the various embodiments of the pressure sensor 100,200,300,400,500 may vary. Each pressure sensor 100,200,300,400,500 maybe altered to suit different applications where different levels of pressure may be measured. Characteristics of each sensor may be evaluated based on material type, application pressure range, the area of the diaphragm 128,228,328,428,528,564,570, the thickness of the diaphragm 128,228,328,428,528,564,570, the area of each aperture 126,226,326,426,526, and the size of each radius 154,254,356,454,596,598,600.

Figures 7, 8:
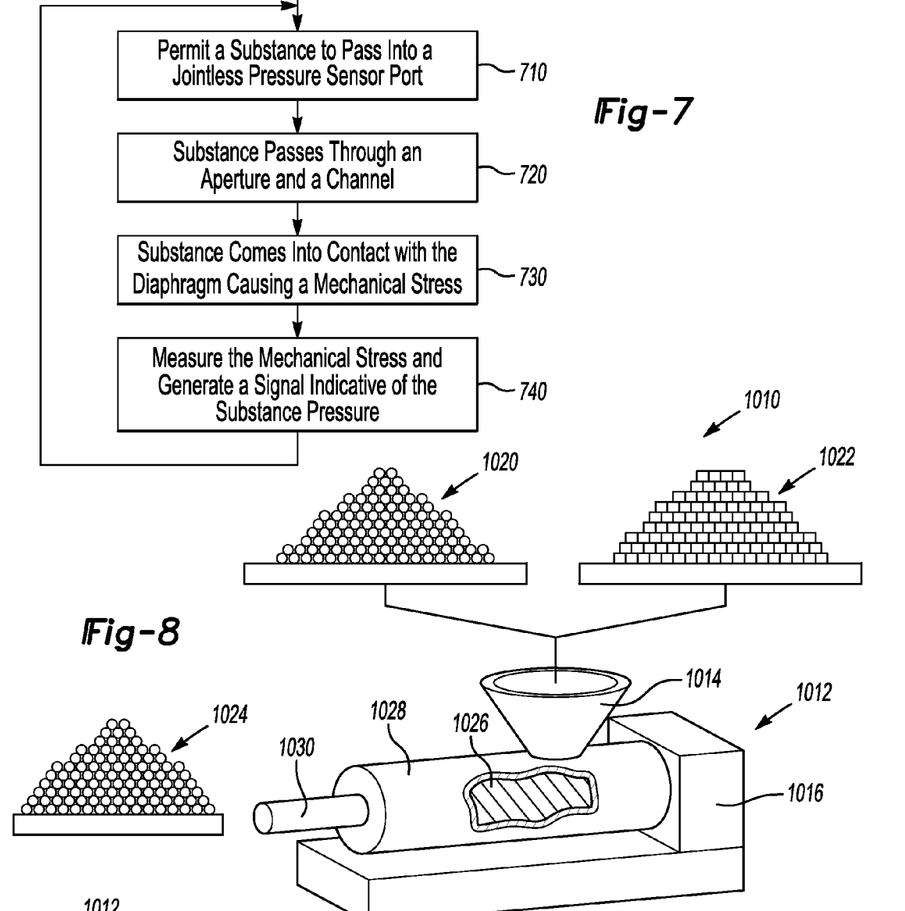
FIG. 7 is a flow diagram illustrating a method for measuring pressure through a jointless pressure sensor port, in accordance with some embodiments.
FIG. 8 is a perspective view of a mixer used as part of a metal injection molding process to create a jointless pressure sensor port, in accordance with some embodiments.

FIG. 7 is a flow diagram illustrating a method for measuring pressure through a jointless pressure sensor port, in accordance with some embodiments. In some embodiments, the method illustrated in FIG. 7 may be performed by one or more of the devices illustrated in FIG. 2, FIG. 3, FIG. 4, FIG. 5, and FIG. 6.

Processing begins at 700 whereupon, at block 710, a substance is permitted to pass into a jointless pressure sensor port. In some embodiments, the substance is a fluid, a vapor, or a gas.

At block 720, the substance passes through an aperture and a channel. In some embodiments, the channel has three or more areas in order to transition from the area of the aperture to the area of the diaphragm. In yet another embodiment, the channel may have one or more taper regions. The taper regions may also have some other geometrical shape.

At block 730, the substance comes into contact with the diaphragm or diaphragms of the jointless pressure sensor port. This contact results in a mechanical stress on the diaphragm or diaphragms. The area of the diaphragm or diaphragms is larger than the area of the aperture, resulting in an increase in sensitivity and overall performance.

At block 740, the mechanical stress on the diaphragm or diaphragms is measured and a signal is generated indicative of the substance pressure. In some embodiments, the stress is measured electronically. In yet another embodiment, the stress is measured optically.

The process loops back to 710 for continuous monitoring of the substance pressure.

In some embodiments, a metal injection molding (MIM) process may be used to create a part for a jointless pressure sensor, such as the jointless pressure sensor ports 100,200, 300,400,500 shown in the Figures. The process is achieved by first making a sacrificial piece of material, also referred to as a "core," (typically made of resin), where the sacrificial piece is shaped according to the internal pathways inside the metal housing which connect the access hole (or aperture) to the diaphragm (or diaphragms). Then this sacrificial piece is inserted into a larger metal injection molding mold tool. Metal powder with a binder system made of the same resin as the sacrificial piece is then injected into the mold. The part then goes through a de-bind process to remove the sacrificial piece and most of the binder. The next step is to sinter the part which causes it to shrink by a percentage of typically 15 to 20%. Also, any remaining resin is chemically removed during this process to leave a fully densified metal pressure sensor housing with a very unique internal geometry that is not achievable thru conventional machining methods.

It is also very important to note that this application of the MIM technology is virtually limitless as to the number of unique complex geometries which could be formed inside of a metal part. By way of explanation, but not limitation, the second channel region 136 shown in FIG. 1 is larger than the channel region 134. To achieve this shape is almost impossible using a milling or drilling process. While the MIM process is used to create the shape of the geometries shown in the Figures, is it within the scope of the invention that other shapes required for different pressure sensors are contemplated as well.

An example of the MIM process is shown in FIGS. 8-12, generally at 1010. The process 1010 includes mixer, shown generally at 1012, having a funnel 1014, and an actuator, such as an electric motor 1016. The mixer 1012 is partially surrounded by heater bands 1018, which heat the mixture of metal powder, shown generally at 1020, and polymeric binder, shown generally at 1022, to create feedstock, shown generally at 1024. The mixer 1012 also includes a helically shaped driver 1026 which is driven by the motor 1016. The driver 1026 is disposed within a cylinder 1028, and a feeder tube 1030 connected to the cylinder 1028. As the powder 1020 and binder 1022 are both poured into the funnel 1014, and powder 1020 and binder 1022 are mixed together to become the feedstock 1024. The feedstock 1024 is further mixed by the driver 1026 and moved through the cylinder 1028 and into the feeder tube 1030. As the feedstock 1024 is moved through the cylinder 1028, the feedstock 1024 is heated by the heater bands 1018, further mixing the feedstock 1024.

Figure 9:
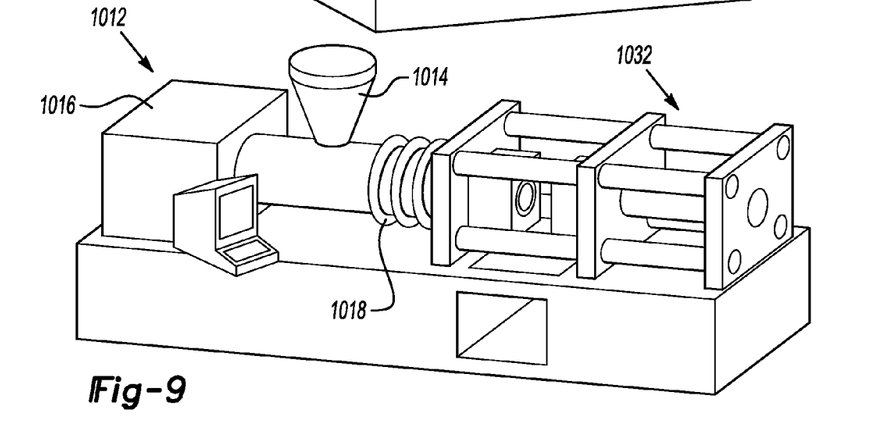
FIG. 9 is a perspective view of a mixer connected to a mold, which is used as part of a metal injection molding process to create a jointless pressure sensor port, in accordance with some embodiments.
Figure 10:
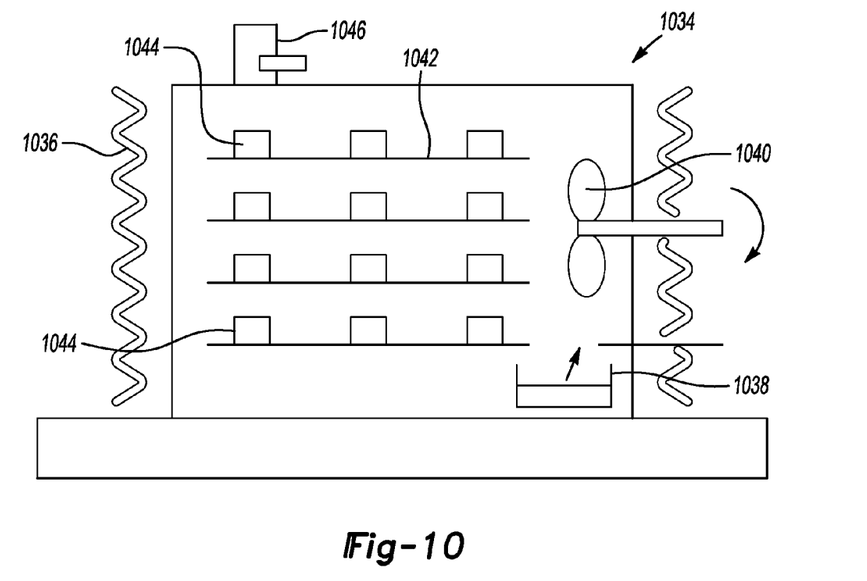
FIG. 10 is a diagram of a debinding oven used as part of a metal injection molding process to create a jointless pressure sensor port, in accordance with some embodiments.

The heated feedstock 1024 is injected into a mold, shown generally at 1032, from the feeder tube 1030, where the mold 1032 has a cavity in the shape of the desired part. The mold 1032 may also include a core, which is used to achieve the shapes shown in the Figures, or another shape if desired, depending upon the application. After the part is removed from the mold 1032, the part is placed into a debinder, which in this embodiment is a debinding oven, shown generally at 1034, and heated to a temperature below the softening point of the binder 1022. This process removes substantially all of the binder 1022 and the core (if a core is used), leaving a porous matrix of metal powder 1020 and a small amount of binder material 1022 to hold the matrix of metal powder 1020 together. The debinding oven 1034 includes heater coils 1036, a catalytic combustion unit, shown generally at 1038, a fan 1040 to provide circulation, and several shelves 1042 for locating multiple parts 1044, and an exhaust burner 1046.

Figure 11:
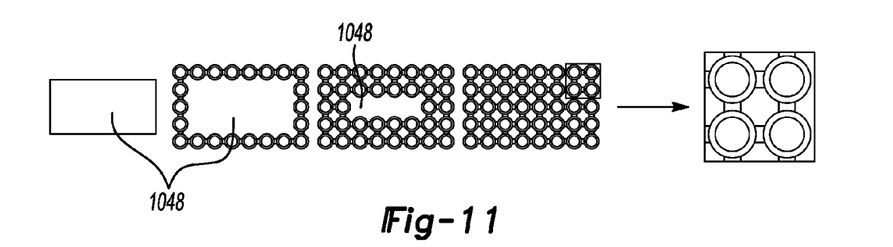
FIG. 11 is a diagram of a metal powder and binder mixed together having a core, during part of a metal injection molding process to create a jointless pressure sensor port, in accordance with some embodiments.

Once the parts are placed in the debinding oven 1034, the heater coils 1036 and catalytic combustion unit 1038 are activated. The fan 1040 and exhaust burner 1046 are activated as well. The heater coils 1036 heat the parts 1044, and the catalytic combustion unit 1038 and the fan 1040 pass a catalyst around the parts 1044 to react with the binder 1022, removing most of the binder 1022 from the parts 1044. The exhaust burner 1046 burns off the excess exhaust from the catalytic combustion unit 1038. In the application where a part 1044 is being made that requires a core 1048, as shown in FIG. 11, the core 1048 is removed during the debinding process.

Figure 12:
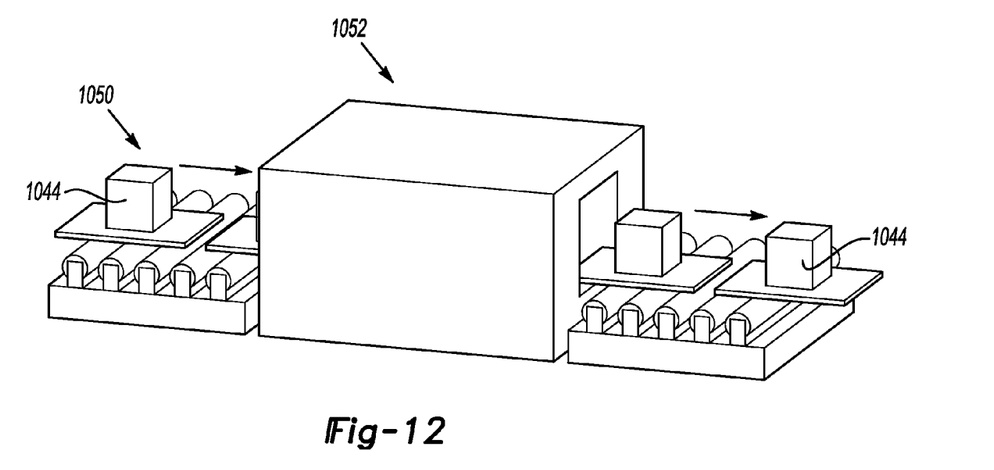
FIG. 12 is a perspective view of a furnace and conveyor belt used as part of a metal injection molding process to create a jointless pressure sensor port, in accordance with some embodiments.

After the debinding process is complete, most of the binder 1022 is removed from the parts 1044, but some binder is left to allow each part 1044 to retain its shape. The parts 1044 then undergo a sintering process. In one embodiment, the parts 1044 are placed onto a conveyor belt, shown generally at 1050, which passes each of the parts 1044 through a furnace, shown generally at 1052, where the parts 1044 incur some shrinkage to reach their desired density and dimensions.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
    a pressure sensor port, including:
        a channel located along an axis;
        at least one channel region formed as part of the channel;
        an aperture having a first area, the at least one channel region in fluid communication with the aperture; and
        a diaphragm being substantially perpendicular to the axis of the channel, the diaphragm having a second area which is larger than the first area;
        a body portion;
        a flange portion integrally formed with the body portion; and
        a cylindrical portion integrally formed with and extending away from the flange portion, the channel at least partially extending into the body portion, the flange portion, and the cylindrical portion;
        wherein the pressure sensor port is jointless and seamless, and the body portion, the flange portion, and the cylindrical portion are jointless and seamless.

2. The apparatus of claim 1, the at least one channel region further comprising:
    a first end having an area which substantially matches the first area; and
    a second end having an area which substantially matches the second area;
    wherein the at least one channel region is tapered between the first end and the second end.

3. The apparatus of claim 1, the at least one channel region further comprising:
    a first channel region in fluid communication with the aperture, the first channel region having an area which is substantially similar to the area of the aperture; and
    a second channel region having an area which is substantially similar to the second area of the diaphragm;
    wherein the first channel region and the second channel region allow for flow from the aperture to the diaphragm.

4. The apparatus of claim 3, the at least one channel region further comprising an intermediate channel region having an area which is larger than the first area and smaller than the second area.

5. The apparatus of claim 3, further comprising:
    a first tapered channel region where the area of the first tapered channel region varies in a taper to substantially match the first area of the aperture; and
    a second tapered channel region, where the area of the second tapered channel region varies in a taper to substantially match the area of the first channel region and the second area of the diaphragm;

wherein the first tapered channel region and the second tapered channel region improve flow through the first channel region and the second channel region.

6. The apparatus of claim 3, further comprising:
a plurality of channels; and
a plurality of diaphragms, each of the plurality of channels operable for delivering fluid to at least one of the plurality of diaphragms.

7. The apparatus of claim 6, wherein each of the plurality of diaphragms is substantially perpendicular to the axis.

8. A pressure sensor, comprising:
a body portion;
a flange portion integrally formed with the body portion;
a cylindrical portion integrally formed with and extending away from the flange portion;
an aperture having a first area, the aperture formed as part of the cylindrical portion;
a channel located along an axis, the channel at least partially extending through the cylindrical portion, the flange portion, and the body portion;
a diaphragm having a second area which is larger than the first area, the diaphragm also having a top surface and a bottom surface;
at least one channel region being part of the channel; and
a pressure sensor disposed on the top surface;
wherein the diaphragm is substantially perpendicular to the axis of the channel, and the body portion, flange portion, and cylindrical portion form a jointless and seamless pressure sensor port.

9. The pressure sensor of claim 8, the at least one channel region further comprising:
a first end having an area which substantially matches the first area; and
a second end having an area which substantially matches the second area;
wherein the at least one channel region varies in taper between the first end and the second end, allowing flow through the at least one channel to the diaphragm.

10. The pressure sensor of claim 8, the at least one channel region further comprising:
a first channel region in fluid communication with the aperture, the first channel region having an area which is substantially similar to the first area of the aperture; and
a second channel region having an area which is substantially similar to the second area of the diaphragm;
wherein the first channel region and the second channel region allow for flow from the aperture to the diaphragm.

11. The pressure sensor of claim 10, the at least one channel region further comprising an intermediate channel region having an area which is larger than the first area and smaller than the second area.

12. The pressure sensor of claim 10, further comprising:
a first tapered channel region where the area of the first tapered channel region varies in a taper to match the first area and the area of the aperture; and
a second tapered channel region, where the area of the second tapered channel region varies is tapered to having at least one area which is substantially similar to the first area and at least one area which is substantially similar to the second area;
wherein the first tapered channel region and the second tapered channel region improve flow through the first channel region and the second channel region.

13. The pressure sensor of claim 10, further comprising:
a plurality of channels; and
a plurality of diaphragms, each of the plurality of channels operable for delivering fluid to at least one of the plurality of diaphragms.

14. The pressure sensor of claim 13, wherein each of the plurality of diaphragms is substantially perpendicular to the axis.

* * * * *